United States Patent Office 3,321,503
Patented May 23, 1967

3,321,503
REACTIONS OF TRIMETHYLALUMINUM WITH HYDRAZINES AND PRODUCTS THEREOF
Neil R. Fetter, Arlington, Calif., and Bodo K. W. Bartocha, Indian Head, Md., assignors to the United States of America as represented by the Secretary of the Navy
No Drawing. Filed Apr. 3, 1962, Ser. No. 184,858
13 Claims. (Cl. 260—448)

The invention described herein may be manufactured and used by or for the Government of the United States of America for governmental purposes without the payment of any royalties thereon or therefor.

The present invention relates to new trialkylaluminum hydrazine complexes and to the synthesis thereof.

The general object of this invention is to provide new compounds of the trialkylaluminum hydrazine complexes which have physical characteristics suitable for explosive and propellant additives.

Another object of this invention is to provide new compounds which may have use as rocket fuels and for explosives.

In accordance with the present invention new trialkylaluminum hydrazine complexes were synthesized by the reaction of hydrazine and alkylhydrazines with trialkylaluminum compounds. The reaction is accomplished by reacting a member selected from the group consisting essentially of trimethylaluminum and trimethylaluminum trimethylamine with a member selected from the group consisting essentially of 1,2-dimethylhydrazine, 1,1-dimethylhydrazine, tetramethylhydrazine, trimethylhydrazine, methylhydrazine and hydrazine at a reaction medium ranging from $-10°$ C. to $-196°$ C., and slowly warming to room temperature until a product forms.

The following examples serve to illustrate how the present invention may be carried out in practice; however, the invention is not restricted to the examples.

*Example I.—Trimethylaluminum and hydrazine*

Starting with a pentane solution of trimethylaluminum $(CH_3)_3Al$ at $-10°$ C. enough hydrazine is added dropwise with vigorous stirring so that no more than one mole of hydrazine per mole of trimethylaluminum is present in the reaction mixture. The mixture is allowed to reach room temperature slowly and the pentane is removed by vacuum. There remains a flocculent white precipitate which has the formula

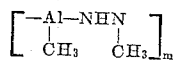

Elemental analysis of this product gave the following results:
Calculated for $CH_5N_2Al$: C=16.44%; H=8.28%; N=38.36%; Al=36.93%. Found: C=18.05%; H=7.77%; N=34.62%; Al=32.25%. This reaction may be represented as follows:

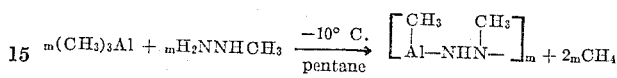

This material decomposes slowly in air, reacts mildly with water and methanol and decomposes slowly above 150° C. upon heating in a nitrogen atmosphere

*Example II.—Trimethylaluminum and methylhydrazine*

To a solution of 1.0 gram of trimethylaluminum per 100 ml. of pentane maintained at $-10°$ C., methylhydrazine is added slowly so that the molar ratio of methylhydrazine to trimethylaluminum is slightly greater than one. After the addition is complete the mixture is allowed to warm to room temperature with continued stirring for an hour. During this period a precipitate forms and gas is evolved. The solvent and excess methylhydrazine are removed by vacuum and the remaining product is a flocculent white polymer with the formula

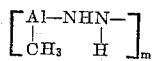

Elemental analysis of the product gave the following results:
Calculated for $C_2H_7N_2Al$: C=27.90%; H=8.19%; N=32.55%; Al=31.35%. Found: C=28.18%; H=8.05%; N=30.37%; Al=30.40%. The reaction may be expressed by the following equation:

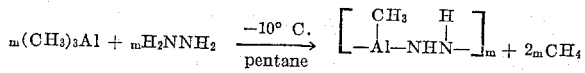

*Example III.—Trimethylaluminum trimethylamine and 1,2-dimethylhydrazine*

Under high vacuum conditions, 0.53 gram of 1,2-dimethylhydrazine is distilled onto 0.81 gram of trimethylaluminum trimethylamine, $CH_3Al:N(CH_3)_3$, at $-196°$ C. After transfer is complete, the mixture is brought to room temperature and allowed to stand for 18 hours. During this period a white solid forms. The excess 1,2-dimethylhydrazine is removed by pumping and the product is a fragile white product with the formula

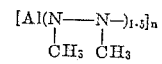

Elemental analysis of the product gave the following results:
Calculated for $C_3H_9N_3Al$: C=31.58%; H=7.94%; Al=23.65%. Found: C=30.34%; H=7.94%; Al=24.09%. The reaction may be represented by the following equation:

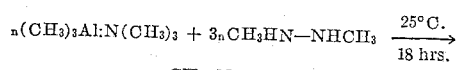

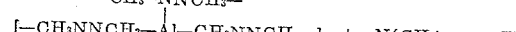

This material decomposes very slowly in air and hydrolyses slowly in water and methanol. It decomposes slowly when heated above 200° C. in a nitrogen atmosphere.

*Example IV.—Trimethylaluminum trimethylamine and 1,1-dimethylhydrazine*

Under high vacuum conditions, 1.62 grams of 1,1-dimethylhydrazine is distilled onto 1.36 grams of trimethylaluminum trimethylamine contained in a 50 ml. reaction vessel at $-196°$ C. After the transfer is completed the mixture is warmed slowly to room temperature. The excess 1,1-dimethylhydrazine is pumped off and the crude product is vacuum sublimed at 30° C. onto a $-15°$ C. cold surface. The yield of sublimed compound is approximately 65 mole percent and the formula is $$(CH_3)_2AlNHN(CH_3)_2 \cdot NH_2N(CH_3)_2$$

Elemental analysis of the product gave the following results:
Calculated for $C_6H_{21}N_4Al$: C=40.89%; H=12.01%; N=31.78%; Al=15.30%. Found: C=40.60%; H=11.77%; N=31.58%; Al=15.95%. The reaction for this reaction may be represented by the following equation:

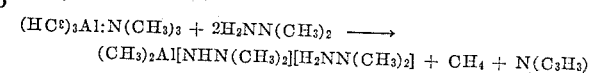

This compound decomposes rapidly in air, reacts mildly with water and methanol and decomposes slowly above 150° C. upon heating in a nitrogen atmosphere. The melting point is 81.0–81.2° C.

*Example V.—Trimethylaluminum and trimethylhydrazine*

Under high vacuum 1.27 grams of trimethylhydrazine is distilled onto 1.24 grams of trimethylaluminum, $(CH_3)_3Al$, at $-196°$ C. The mixture is heated at $55°$ C. for 20 hours and at the end of this period any excess trimethylhydrazine is pumped off and the crude product is sublimed under vacuum at $60°$ C. onto a $-15°$ C. cold surface. The yield of purified compound is approximately 70 mole percent. The product is dimeric at room temperature and the formula is $[(CH_3)_2AlNCH_3N(CH_3)_2]_2$. Elemental analysis of the above compound gave the following results:

Calculated for $(CH_3)_2AlNCH_3N(CH_3)_2$: C=46.13%; H=11.61%; N=21.52%; Al=20.73%. Found: C=45.59%; H=11.52%; N=23.49%; Al=20.42%. The reaction may be represented by the following equation:

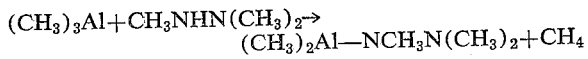

$(CH_3)_3Al + CH_3NHN(CH_3)_2 \rightarrow$
$(CH_3)_2Al-NCH_3N(CH_3)_2 + CH_4$

This compound decomposes rapidly in air, reacts vigorously in water, hydrolyses rapidly in methanol and has a melting point of 125–126° C.

*Example VI.—Trimethylaluminum and tetramethylhydrazine*

Under high vacuum conditions 1.51 grams of tetramethylhydrazine is distilled onto 1.10 grams of trimethylaluminum at $-196°$ C. The reaction mixture is brought to room temperature (about $25°$ C.) and allowed to stand for 2 hours. Any excess tetramethylhydrazine is pumped off and the crude product is vacuum sublimed at $60°$ C. onto a $-15°$ C. cold surface. The formula of this compound is

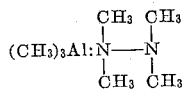

and an elemental analysis gave the following results:

Calculated for $C_7H_{21}N_2Al$: C=52.47%; H=13.21%; N=17.48%; Al=16.84%. Found: C=52.48%; H=13.03%; N=17.40%; Al=16.87%. The reaction may be represented by the following equation:

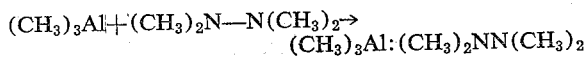

$(CH_3)_3Al + (CH_3)_2N-N(CH_3)_2 \rightarrow$
$(CH_3)_3Al:(CH_3)_2NN(CH_3)_2$

This material decomposes rapidly in air, reacts violently with water, hydrolyses rapidly with methanol and has a melting point of 65–66° C.

The reactions and techniques described herein may be carried out with other aluminum alkyls of the general formula $R_3Al$ and other alkyl hydrazines.

Obviously many modifications and variations of the present invention are possible in the light of the above teachings. It is therefore to be understood, that within the scope of the appended claims, the invention may be practiced otherwise than as specifically described.

What is claimed is:

1. A process comprising reacting a member selected from the group consisting essentially of trimethylaluminum and trimethylaluminum trimethylamine with a member selected from the group consisting essentially of 1,2-dimethylhydrazine, 1,1-dimethylhydrazine, tetramethylhydrazine, trimethylhydrazine, methylhydrazine and hydrazine at a reaction temperature ranging from $-10°$ C. to $-196°$ C. and warming to room temperature whereby a product forms.

2. A process comprising adding hydrazine dropwise with vigorous stirring to trimethylaluminum at a temperature of about $-10°$ C., warming slowly to room temperature until a flocculent white precipitate forms.

3. The product of the process of claim 2 having the unit formula

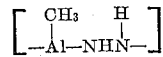

4. A process comprising adding slowly methylhydrazine to trimethylaluminum at a temperature of about $-10°$ C., warming to room temperature with continued stirring until a white precipitate forms.

5. The product of the process of claim 4 having the unit formula

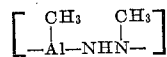

6. A process comprising reacting 1,2-dimethylhydrazine with trimethylaluminum trimethylamine at about $-196°$ C., warming to room temperature and maintaining at said room temperature for about 18 hours until a white solid forms.

7. The product of the process of claim 6 having the unit formula

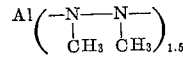

8. A process comprising adding 1,1-dimethylhydrazine to trimethylaluminum trimethylamine at a temperature of about $-196°$ C., warming slowly to room temperature until a precipitate forms.

9. The compound having the formula

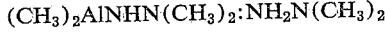

$(CH_3)_2AlNHN(CH_3)_2:NH_2N(CH_3)_2$

10. A process comprising adding trimethylhydrazine to trimethylaluminum at a reaction temperature of about $-196°$ C., warming to a temperature of about $55°$ C. for about 20 hours whereby a precipitate forms.

11. The compound having the formula

$(CH_3)_2AlN:CH_3N(CH_3)_2$

12. A process comprising adding tetramethylhydrazine to trimethylaluminum at a reaction temperature of $-196°$ C., warming to room temperature for about 2 hours until a precipitate forms.

13. The compound having the formula

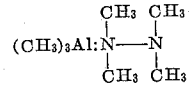

No references cited.

TOBIAS E. LEVOW, *Primary Examiner.*

LEON D. ROSDOL, *Examiner.*

J. W. WHISLER, *Assistant Examiner.*